Figure 1:
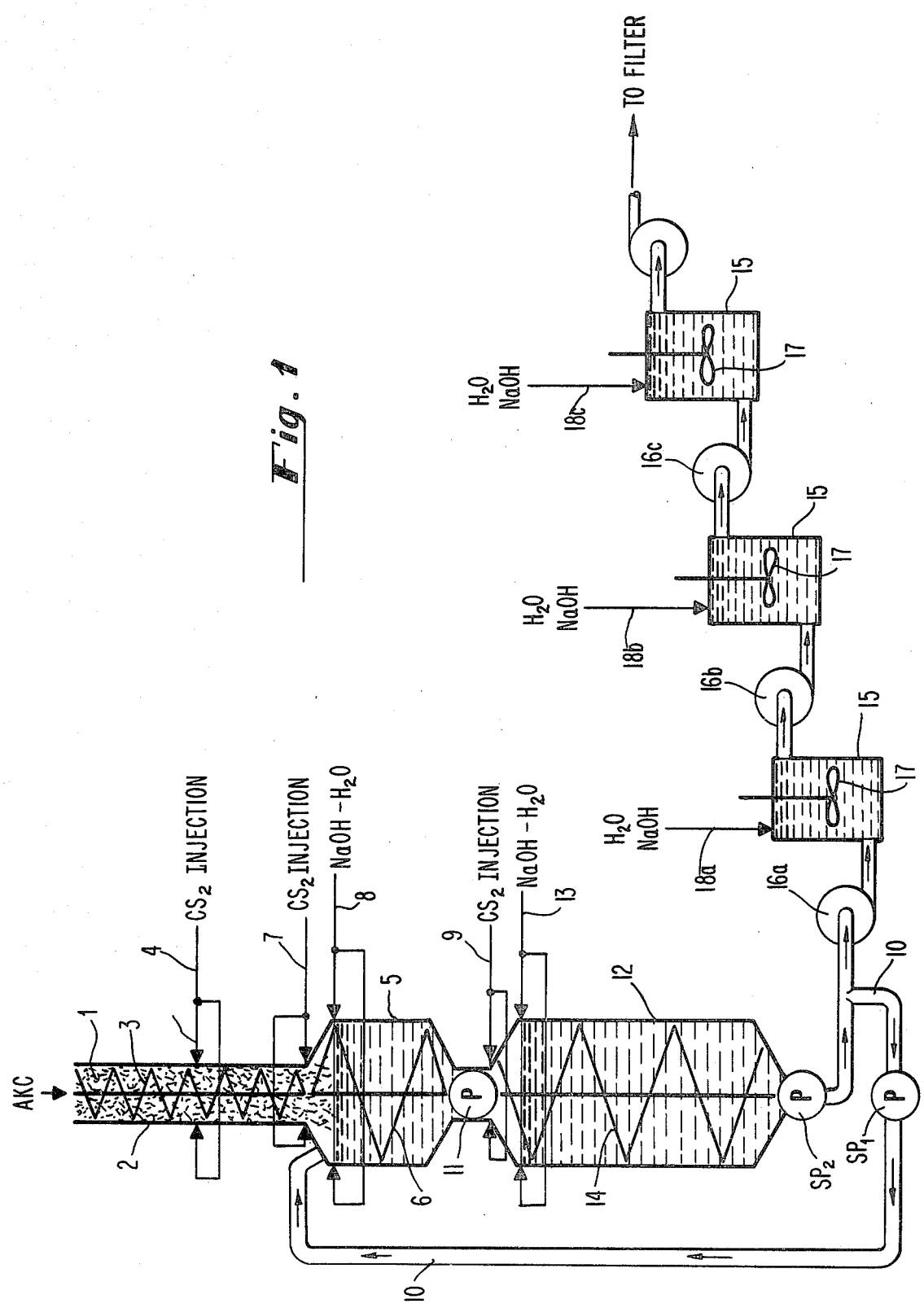

United States Patent [19]

Geyer, Jr. et al.

[11] 4,158,698

[45] Jun. 19, 1979

[54] APPARATUS FOR CONTINUOUS XANTHATION AND PRODUCTION OF VISCOSE SPINNING SOLUTION

[75] Inventors: Charles J. Geyer, Jr., Berwyn; Ben E. White, Wayne, both of Pa.

[73] Assignee: Fiber Associates, Inc., Berwyn, Pa.

[21] Appl. No.: 769,179

[22] Filed: Feb. 16, 1977

Related U.S. Application Data

[62] Division of Ser. No. 610,419, Sep. 4, 1975, Pat. No. 4,037,039.

[51] Int. Cl.$^2$ .............................................. B01J 1/00
[52] U.S. Cl. ............................... 422/189; 536/60; 536/61; 422/226; 422/234
[58] Field of Search ............... 23/260, 252 R, 285, 23/290.5, 283; 536/60, 61

[56] References Cited

U.S. PATENT DOCUMENTS

| 1,842,688 | 1/1932 | Richter | 536/60 |
| 2,338,196 | 1/1944 | Nash | 536/61 |
| 2,762,795 | 9/1956 | Schlosser et al. | 536/60 |
| 3,836,336 | 9/1974 | Yasui et al. | 23/290.5 R |

*Primary Examiner*—James H. Tayman, Jr.
*Attorney, Agent, or Firm*—Miller & Prestia

[57] ABSTRACT

A continuous feed of alkali cellulose (AKC) is partially xanthated, and then dissolved and further xanthated to form a viscose solution, while passing continuously through a series of connected reactors and slurry vessels, wherein slurries of carbon disulfide ($CS_2$) and alkali metal hydroxide are maintained. The AKC feed to the system may be shredded crumbs from any standard alkali cellulose system, to shredded crumbs from a continuous sheet steeping mercerization system. A portion of the xanthate AKC (cellulose xanthate) may be recycled to the various slurry vessels or zones.

11 Claims, 2 Drawing Figures

APPARATUS FOR CONTINUOUS XANTHATION AND PRODUCTION OF VISCOSE SPINNING SOLUTION

This a division of application Ser. No. 610,419, filed Sept. 4, 1975 now U.S. Pat. No. 4,037,039.

This invention pertains to process and apparatus for continuously xanthating alkali cellulose (AKC) and for converting such alkali cellulose into a spinnable viscose solution.

In many conventional processes for making viscose spinning solution, alkali cellulose is xanthated by contact with carbon disulfide ($CS_2$) in a batch process. Typically, the alkali cellulose is in crumb or shredded form and is converted into a sticky mass by xanthation.

Numerous efforts have been made to provide a commercially acceptable continuous xanthation process and apparatus thereof. Examples include the processes and apparatus disclosed in U.S. Pat. No. 2,762,795—Schlosser et al. (xanthation of sheet alkali cellulose passing through a sealed chamber), U.S. Pat. No. 2,801,998—Robertson (conventional crumb xanthation followed by later stage involving continuous mixing in wet forms), U.S. Pat. No. 2,987,647—Von Kohorn (continuous xanthation of crumb), U.S. Pat. No. 3,385,845—Trieber (semi-continuous batch addition and passage through dry xanthation stage followed by a final wet stage), U.S. Pat. No. 3,438,969—Meister (xanthation in a kneader-type reactor followed by a vertical column and subsequent vertical solution-forming tower with agitator) and U.S. Pat. No. 3,671,279—Yasui et al. (continuous kneading and passage of crumb and dough-like material).

Of these, Robertson is most pertinent to the present invention in that it involves a first dry xanthation stage and a second wet or immersion stage. In all of these "staged" processes, however, the $CS_2$ is fully reacted and the xanthation reaction, with the available $CS_2$, is taken to completion in the first stage. This procedure neglects the sequential path of the xanthation reaction in which the secondary hydroxyls of the cellulose molecule (the conventionally designated $C_2$ and $C_3$ positions) are readily substituted in a matter of minutes while the transfer of the substituted $CS_2$ to the primary hydroxyl (at the conventionally designated $C_6$ position) takes much longer. The latter transfer, however, occurs much more readily in a slurry xanthate reaction.

Having in mind certain inherent disadvantages in the continuous or semi-continuous xanthation processes and apparatus heretofore known, and in the processes and apparatus for the subsequent conversion of the xanthate product into a spinning solution, it is the general object of the present invention to provide an improved and more practical process and apparatus for continuously converting either shredded crumbs or continuous strips of alkali cellulose in sheet form into, ultimately, a viscose spinning solution.

A more specific objective of this invention is to provide process and apparatus facilitating in-line continuous xanthation and dissolution of the xanthated product in stages designed to effect maximum overall efficiency and minimum process problems associated with typical batch and semi-batch processes.

These objectives, and others which will be apparent in the course of the subsequent discussion, are met, briefly, by a xanthation system including a vessel containing a $CS_2$-alkali hydroxide slurry in which alkali cellulose feed, which has been first partially xanthated in a dry state for a short period of time, is immersed and held for a period of time. Carbon disulfide is also introduced into the vessel at a rate to effect at least partial xanthation of the incoming alkali cellulose feed at its pre-selected feed rate. Slurry is withdrawn from the bottom of the vessel at a rate to maintain a minimum residence time, on the order of 5-10 minutes, of alkali cellulose in the vessel. Means are also included for introducing make-up alkali hydroxide solution to maintain a constant level of liquid slurry in the vessel.

The process is generally carried out at atmospheric pressure with a temperature maintained in the range of 30°-45° C., preferably about 35° C. Slurry taken from the slurry holding vessel is transferred to a screw extruder mixer where further mixing and xanthation occur, with the further addition of carbon disulfide and alkali hydroxide solution as necessary.

The alkali cellulose feed to the slurry vessel (where it is first immersed and reacted) is a shredded partially pre-xanthated alkali cellulose which is delivered through a closed passageway from a closed pre-xanthation chamber into which sufficient carbon disulfide is introduced to effect the desired partial pre-xanthation. Means may also be included for introducing an indefinite length strip of alkali cellulose in sheet form in a continuous manner into such a pre-xanthation chamber with sealing means to prevent escape of gases therefrom at the alkali cellulose entry point. The alkali cellulose is passed continuously through the chamber, where it is partially pre-xanthated (and shredded, if in sheet form), and from there to the slurry xanthation vessel previously described.

The present invention also encompasses continuous mixing and spinning solution-forming means particularly adapted to be used downstream of and in conjunction with the continuous xanthation process and apparatus of this invention. This continuous mixing means comprises generally an elongated passageway preferably including mass dividers or "attritors" near the upstream end thereof to break down the otherwise viscous sticky mass of xanthated alkali cellulose passing therethrough. The elongated passageway also includes, at spaced intervals, means for introducing additional alkali hydroxide solution followed by internal mixers continuously mixing the newly introduced alkali hydroxide solution with the mass in the passageway. At least two such additional solution introducing means and internal mixing means should be spaced at intervals along the passageway. Downstream, a homogenous solution of xanthated alkali cellulose and alkali hydroxide is delivered in form suitable for aging, if required, filtration and spinning into fiber form.

Figure 2:
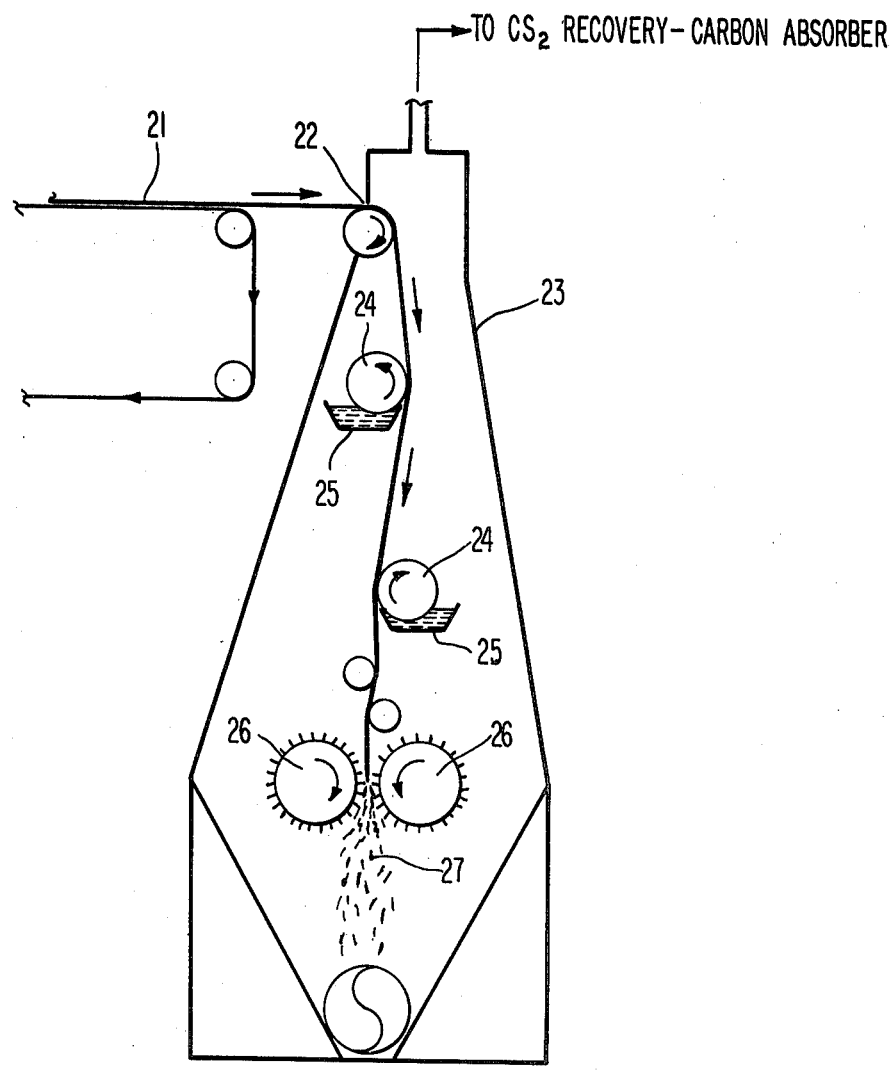

This invention may be better understood by reference to the subsequent detailed description thereof, taken in conjunction with the appended claims and the figures, wherein:

FIG. 1 is a diagrammatical illustration of the basic elements of the dry and slurry xanthation and viscose spinning solution forming apparatus of the present invention in its preferred embodiment; and FIG. 2 is a diagrammatical illustration of one type of pre-xanthation and shredding stage preferably used in combining the xanthation process and apparatus of this invention with a continuous sheet steeping process for producing alkali cellulose.

The xanthate reaction, that is the reaction between $CS_2$ and AKC, can take place in the gas-solid phase or in the solution phase (that is, $CS_2$ introduced into a slurry of AKC, NaOH and water). There are advantages to be gained in both quality and speed of reaction by using both reaction mechanisms. In the initial stages of the reaction it is advantageous, both for final quality, and speed of complete xanthation and mixing, to utilize the gas-solid reaction, keeping the AKC "dry," i.e., undissolved. In less than five minutes, the $CS_2$ can be substituted on the $C_2$ and $C_3$ hydroxyls (the secondary hydroxyls) in the dry pre-xanthation stage. Subsequently the reaction of xanthation and solution (including transfer of the $CS_2$ to the $C_6$ or primary hydroxyl position to complete the xanthation process) proceeds at a much higher rate if it is carried out in solution or slurry. In the process and apparatus of the present invention, maximum advantage is taken of both of these reaction possibilities.

Turning more specifically to FIG. 1, there is shown a process and apparatus wherein shredded alkali cellulose or crumb 1 is fed into the top of a cylindrical column 2. The AKC is advanced vertically down the column by means of an advancing screw 3. Approximately 5 feet down the column, $CS_2$ is introduced through several spray heads 4 placed around the column. The height of AKC above the $CS_2$ spray heads 4 serves to seal off $CS_2$ preventing it from escaping upward out of the apparatus as the AKC will absorb and react with all the $CS_2$ introduced. The xanthate reaction is thereby initiated in this region. The AKC-$CS_2$ mixture continues downward in the column for approximately five feet more while the xanthate reaction is progressing. Its total residence time in this part of the reactor is on the order of 3–20 minutes and 5–35% of the total required $CS_2$ is introduced in this dry stage. The reacting mass is then introduced into a larger diameter column called the primary reactor 5. A second advancing screw 6 insures the uniform advancement of the mass downward. However, this screw is designed to turn at a moderate speed and to insure thorough blending and mixing throughout the reactor. At the head of this reactor additional $CS_2$ is added by injectors 7 and directly thereafter a water solution of alkali hydroxide, usually NaOH, is introduced through injectors 8. The AKC has by this time become partially xanthated and the solubility in weak alkali has increased to the point that partial dissolution takes place. The dissolved and partially reacted AKC forms a slurry in which the xanthate reaction continues and dissolution of the AKC-xanthate continues as it forms.

The $CS_2$ added in the crumb or shredded AKC column, and in the primary reactor constitutes a large portion, if not all, of the the total $CS_2$ charge required. In some cases a third portion of $CS_2$ may be added through injection to the secondary reactor, to be described later.

Near the top of the primary reactor there may be introduced a recirculated stream of nearly dissolved, and completely xanthated slurry through recycle line 10 from the end of the secondary reactor also including recycle slurry pump $SP_1$. The purpose of this recirculation is to take advantage of the fact that partially xanthated AKC dissolves more readily and uniformly in viscose solution than in a water solution of NaOH or KOH.

From the primary reactor the slurry is continuously pumped, by slurry pump 11, into the secondary reactor. The rate of pumping is of course equal to the rate necessary to remove cellulose from the AKC column 2 as it is introduced. The dwell time in the primary reactor 5 is approximately 10 minutes. The secondary reactor 12 follows the same general design as the primary reactor. However, the vessel is larger, in order to achieve a dwell time of up to 60 minutes. NaOH and $H_2O$ are introduced through inlet lines 13 at the top of the reactor 12, to further the progress of dissolution. A third portion of the total $CS_2$ charge may in some cases also be added here through injectors 9 although in most instances the total $CS_2$ required will have been added in the AKC column 2 and in the primary reactor 5. The advancing screw 14 in secondary reactor 12, as in the primary reactor, is designed to insure uniform advance and thorough blending of the chemical mass. From the outlet of this reactor some viscose slurry may be recirculated to the beginning of the primary reactor through recycle line 10 as discussed above.

From the secondary reactor the slurry is pumped by $SP_2$ continuously through a series of attrition mixing chambers 15–16. The viscose slurry is passed alternately through attrition mills 16 and then mixed by high speed blending propellers 17. Fractions of the total caustic solution charge are added through inlet lines 18 in various cells 15.

It is well known that the most efficacious way to bring viscose into final solution is to do most of the mixing and kneading while the slurry is thick and pasty. After a homogeneous, essentially dissolved, concentrated solution is achieved the final addition of water and caustic are added to bring the solution to the desired final composition. In this way maximum homogeneity is achieved with a minimum of undissolved gels, in minimum solution time.

Heretofore, it has not been practicable to take advantage of this principle as batch xanthate and mixing processes were not well adapted to use the techniques required.

In this process, xanthation and mixing is achieved in about 90 minutes or less by a continuous process requiring little direct labor. Furthermore, the viscose is expected to be of better quality and spinability than any heretofore achieved commercially. This process has been shown in its preferred form with vertical columns and advancing screws. However, horizontal vessels with equivalent advancing mechanisms may also be used.

Turning now to FIG. 2, there is shown a prexanthation stage in which a continuous sheet of AKC is partially xanthated and shredded prior to passage to the xanthation process and apparatus shown in FIG. 1. More specifically, a continuous sheet of mercerized alkali cellulose 21 is fed continuously by means of feed rolls 22 into an enclosed chamber 23. Chamber 23 may be connected to a carbon absorption-type $CS_2$ recovery system conventionally used in the viscose process for recovering dilute mixtures of $CS_2$ gas from air. If desired this chamber may contain a nitrogen atmosphere.

The advancing sheet of AKC is fed over "kiss" rolls 24 whereby $CS_2$ is picked up from a feeding system 25 and imparted to the AKC sheet. The sheet is then passed through disintegrator 26 and the shredded crumbs 27 are fed into the AKC column 2 of FIG. 1. Alternatively, instead of using "kiss" rolls, a spray of $CS_2$ may be injected onto the sheet from each side. $CS_2$ injectors 4 (of FIG. 1) may be omitted if the dry pre-xanthation is accomplished in a chamber such as that shown in FIG. 2.

The following examples typify proposed conditions and expected results in the possible practice of the present invention.

EXAMPLE 1

The feed to the continuous xanthator is an alkali cellulose, by weight:
33% cellulose,
15% NaOH,
52% $H_2O$.
This AKC is pre-shredded, and is fed to initial xanthate and seal column 2 at a rate of 150 pounds per minute. The following total amounts of materials are added throughout the reaction:
14 pounds $CS_2$ per minute
380 pounds $H_2O$ per minute
11 pounds NaOH per minute
to produce a final desired viscose which has the composition:
28.0% $CS_2$, based on dry cellulose weight,
9.0% cellulose, based on viscose weight,
6.0% NaOH, based on viscose weight,
82.5% $H_2O$, based on viscose weight.
Portions of $CS_2$ are added at the points indicated as follows:

| Point | $CS_2$ (pounds added per min) |
| --- | --- |
| 4 FIG. 1 | 4.7 |
| 7 FIG. 1 | 4.7 |
| 9 FIG. 1 | 4.6 |

Portions of $H_2O$ and NaOH are also added at the places and in amounts as follows:

| Point | NaOH (pounds added) per minute | $H_2O$ (pounds added) per minute |
| --- | --- | --- |
| 8 FIG. 1 | 5.5 | 48.4 |
| 13 FIG. 1 | 5.5 | 48.4 |
| 18a FIG. 1 | 0.0 | 94.4 |
| 18b FIG. 1 | 0.0 | 94.4 |
| 18c FIG. 1 | 0.0 | 94.4 |

The dwell times, and operating temperatures for the various stages of the process, as shown in FIG. 1, are given in the table below:

| Reaction Stage or Position | Dwell Time (minutes) | Temperature (°C.) |
| --- | --- | --- |
| Incoming AKC FIG. 1 | | 40 |
| Reactor 2 FIG. 1 | 15 | 40–35 |
| Reactor 5 FIG. 1 | 10 | 35 |
| Reactor 12 FIG. 1 | 35 | 35 |
| Attritor-Mixer 16a, 16b, 16c, 18a, 18b, 18c | 30 | 30 |

EXAMPLE 2

The alkali cellulose feed in this example comes from a continuous sheet double-steep-mercerizing system.
AKC feed to xanthator - mixing process (FIGS. 1-2)
10% NaOH,
33% cellulose,
57% $H_2O$.
The final desired viscose is, as in Example 1:
28% $CS_2$, based on dry cellulose weight,
9% cellulose, based on viscose weight,
6% NaOH, based on viscose weight,
82.5% $H_2O$, based on viscose weight.
Total chemicals added through the xanthate-mixing process:
14.0 pounds $CS_2$, per minute
18.3 pounds NaOH, per minute
373.0 pounds $H_2O$, per minute
Portions of $CS_2$ are introduced at the placed indicated as follows:

| Point | $CS_2$ (pounds added per minute) |
| --- | --- |
| 24 FIG. 2 | 4 |
| 7 FIG. 1. | 5 |
| 9 FIG. 1 | 5 |

Portions of NaOH and $H_2O$ are added at the places and in the amounts indicated, as follows:

| Point | NaOH (pounds added) per minute | $H_2O$ (pounds added) per minute |
| --- | --- | --- |
| 8 FIG. 1 | 9.2 | 82.5 |
| 13 FIG. 1 | 9.1 | 82.5 |
| 18a FIG. 1 | 0.0 | 69.0 |
| 18b FIG. 1 | 0.0 | 69.0 |
| 18c FIG. 1 | 0.0 | 70.0 |

The dwell times and operating temperatures for this example are as follows:

| Reaction Stage or Position | Dwell Time (minutes) | Temperature (°C.) |
| --- | --- | --- |
| Chamber 23 FIG. 2 | 1 | 35 |
| Reactor 2 FIG. 1 | 15 | 35 |
| Reactor 5 FIG. 1 | 10 | 35 |
| Reactor 12 FIG. 1 | 35 | 35 |
| Attritor-Mixer 16, 18 FIG. 1 | 30 | 35 |

In each example, the temperature of the entering AKC may be varied from 30° to 60° C., depending upon method of mercerization. The preferred temperature in the primary and secondary reactors is 35° C., but may vary between 30°–45° C.

While this invention has been described with reference to xanthation in the presence of an alkali hydroxide solution generally, normally this solution is sodium hydroxide. Potassium hydroxide may also be used.

Various other such minor modifications and variations of the present invention will be apparent to those skilled in the art. While this invention has been described, for purposes of definiteness and specificity as required by the statute, with respect to specific embodiments and examples, it should be understood that it is not limited thereto and that the appended claims are therefore intended to be construed to encompass those various modifications and variations which may be made in this invention without departing from the true spirit and scope thereof.

We claim:

1. In an apparatus for xanthating a continuous feed of alkali cellulose and producing a viscose spinning solution therefrom, the improvement which comprises:
a first chamber, said first chamber having means for continuously downwardly feeding shredded alkali cellulose through said chamber while sealing said chamber to prevent the escape of gases therefrom;

means at the lower portion of said first chamber for introducing into said first chamber at a controlled rate an amount of carbon disulfide required to partially xanthate said cellulose, the height of said chamber being sufficient to allow an amount of said cellulose to be present to absorb and react with all of the carbon disulfide introduced; means for continuously removing said alkali cellulose from said first chamber prior to the completion of the reaction between said cellulose and said carbon disulfide and passing it to a second chamber; said second chamber including means for introducing an alkali hydroxide and means for introducing carbon disulfide at a controlled rate so as to permit the further reaction of the xanthated alkali cellulose.

2. Apparatus, as recited in claim 1, including further mixing and spinning solution forming means consisting of an elongated passageway for receiving the mixed reacted product, from said screw extruder means, means for introducing further alkali hydroxide solution into said passageway, and internal mixing means at spaced intervals in said elongated passageway.

3. Apparatus, as recited in claim 2, wherein said mixing means comprises attritors and mixers adapted to grind and mix material passing therethrough.

4. Apparatus, as recited in claim 1, wherein said second chamber includes means for adding incremental amounts of carbon disulfide and sodium hydroxide solution at spaced points along the length thereof in the direction of passage of partially xanthated alkali cellulose slurry therethrough.

5. Apparatus, as recited in claim 4, wherein each of said means for introducing alkali hydroxide solution includes a vessel for continuously receiving, mixing with alkali hydroxide, and discharging said xanthated alkali cellulose.

6. The apparatus of claim 1, including a third chamber, said third chamber having screw means disposed therein for advancing and mixing the alkali cellulose from said second chamber and means for introducing carbon disulfide therein.

7. Apparatus, as recited in claim 6, wherein said third chamber comprises a plurality of separate sub-chambers through which said slurry passes sequentially.

8. Apparatus, as recited in claim 1, including further mixing and spinning solution forming means consisting of an elongated passageway for receiving the mixed reacted product, from said screw extruder means, for introducing further alkali hydroxide solution into said passageway, and internal mixing means at spaced intervals in said elongated passageway.

9. The apparatus according to claim 6, including means for withdrawing the contents of said third chamber at a selected rate, and blending means for blending the contents withdrawn from said third chamber.

10. The apparatus according to claim 6, including means for recycling to said first chamber, a portion of the contents withdrawn from said third chamber.

11. An apparatus for xanthating a continuous feed of alkali cellulose and producing a viscose spinning solution therefrom, which comprises:

a first substantially vertical chamber, said first chamber having means for continuously downwardly feeding shredded alkali cellulose therein so as to seal said chamber and prevent the escape of gases therefrom; means at the lower portion of said first chamber for introducing into said first chamber at a controlled rate an amount of carbon disulfide required to partially xanthate said cellulose, the height of said first chamber being sufficient to allow a suitable amount of said cellulose to be present to absorb and react with all of the carbon disulfide introduced; means for continuously removing said alkali cellulose from said first chamber prior to the completion of the reaction between said cellulose and said carbon disulfide and passing it to an interconnecting second chamber; said second chamber having means for introducing an alkali hydroxide solution therein, means for introducing carbon disulfide at a controlled rate so as to permit the further reaction of the xanthated alkali cellulose, and screw extruder means disposed therein for advancing and further mixing said cellulose from said first chamber, a third chamber interconnected with said second chamber, said third chamber having screw means disposed therein for advancing and mixing the alkali cellulose from said second chamber and means for introducing carbon disulfide therein, said third chamber including means for withdrawing the contents of said third chamber at a selected rate, and blending means associated with said withdrawing means for receiving and blending the contents from said third chamber, and conduit means interconnecting said first chamber and said withdrawing means for recycling a portion of the contents withdrawn from said third chamber.

* * * * *